United States Patent
Katayama et al.

(10) Patent No.: US 12,388,133 B2
(45) Date of Patent: Aug. 12, 2025

(54) THERMAL INSULATION MATERIAL FOR BATTERY PACK AND BATTERY PACK

(71) Applicants: Sumitomo Riko Company Limited, Aichi-ken (JP); TOYOTA JIDOSHA KABUSHIKI KAISHA, Aichi-ken (JP)

(72) Inventors: Naoki Katayama, Aichi-ken (JP); Shinji Kumagai, Aichi-ken (JP); Shota Hayashi, Aichi-ken (JP); Yutaro Taguchi, Aichi-ken (JP); Yuji Shintaku, Aichi-ken (JP)

(73) Assignees: SUMITOMO RIKO COMPANY LIMITED, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 899 days.

(21) Appl. No.: 17/599,799

(22) PCT Filed: Feb. 3, 2021

(86) PCT No.: PCT/JP2021/003867
§ 371 (c)(1),
(2) Date: Sep. 29, 2021

(87) PCT Pub. No.: WO2021/181951
PCT Pub. Date: Sep. 16, 2021

(65) Prior Publication Data
US 2022/0181716 A1    Jun. 9, 2022

(30) Foreign Application Priority Data

Mar. 12, 2020    (JP) .................................. 2020-043369

(51) Int. Cl.
*H01M 10/658*    (2014.01)
*H01M 50/222*    (2021.01)

(52) U.S. Cl.
CPC .................................. *H01M 10/658* (2015.04)

(58) Field of Classification Search
CPC ............. H01M 10/658; H01M 50/204; H01M 10/647; H01M 10/0525; H01M 10/651;
(Continued)

(56) References Cited

U.S. PATENT DOCUMENTS

| 2003/0077438 A1 | 4/2003 | Frank et al. |
| 2011/0305868 A1* | 12/2011 | Heytens .................. E04B 1/803 |
| | | 428/116 |

(Continued)

FOREIGN PATENT DOCUMENTS

| JP | 11-513349 | 11/1999 |
| JP | 2004-010423 | 1/2004 |

(Continued)

OTHER PUBLICATIONS

JP2004010423A English translation (Year: 2004).*

(Continued)

*Primary Examiner* — Lisa S Park
(74) *Attorney, Agent, or Firm* — Greenblum & Bernstein, P.L.C.

(57) ABSTRACT

A thermal insulation material for a battery pack includes: a thermal insulation layer; and a first base material and a second base material that are arranged with the thermal insulation layer interposed therebetween. The thermal insulation layer contains a porous structure in which a plurality of particles is connected to form a skeleton, reinforcing fibers, and metal oxide nanoparticles serving as a binder, the porous structure having pores inside and having hydrophobic sites at least on a surface of the porous structure out of the surface and inside of the porous structure, and a percentage mass loss of the thermal insulation layer in thermo- (Continued)

gravimetric analysis in which the thermal insulation layer is held at 500° C. for 30 minutes is 10% or less.

14 Claims, 2 Drawing Sheets

(58) Field of Classification Search
CPC ............. H01M 50/209; H01M 50/222; H01M 50/231; H01M 50/24; B32B 2307/51; Y02E 60/10; F16L 59/02
See application file for complete search history.

(56) References Cited

U.S. PATENT DOCUMENTS

| | | | |
|---|---|---|---|
| 2014/0057083 A1 | 2/2014 | Imae et al. | |
| 2017/0029681 A1* | 2/2017 | Kim | C09D 1/04 |
| 2019/0006642 A1 | 1/2019 | Sakaguchi et al. | |

FOREIGN PATENT DOCUMENTS

| | | |
|---|---|---|
| JP | 2013-534958 | 9/2013 |
| JP | 2017-155402 | 9/2017 |
| WO | 2012/000184 | 1/2012 |
| WO | 2013/141189 | 9/2013 |
| WO | 2014/004366 | 1/2014 |
| WO | 2017/159527 | 9/2017 |

OTHER PUBLICATIONS

International Search Report issued in International Patent Application No. PCT/JP2021/003867, dated Apr. 20, 2021.
International Preliminary Report on Patentability Issued in Corresponding International Patent Application No. PCT/JP2021/003867, dated Sep. 6, 2022, along with an English translation thereof.

* cited by examiner

[FIG. 1]
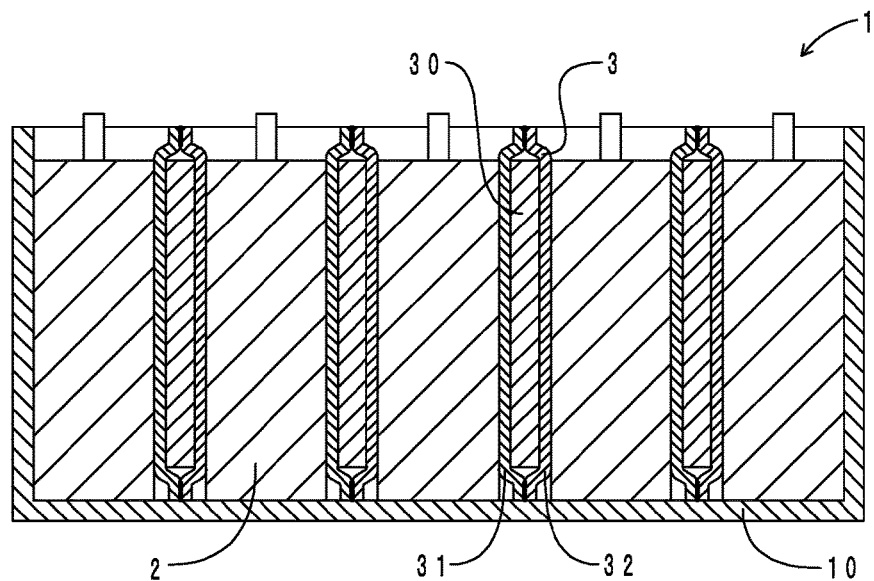
[FIG. 2]
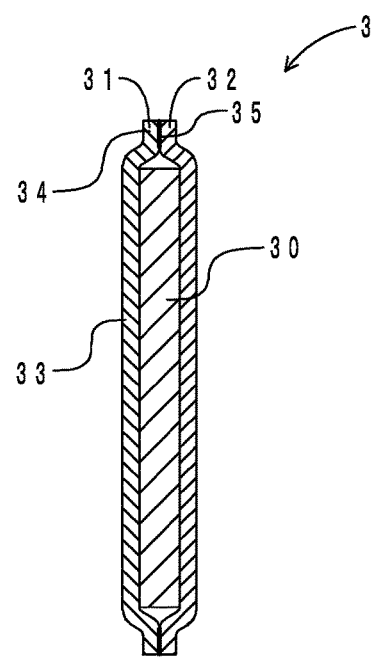

[FIG. 3]
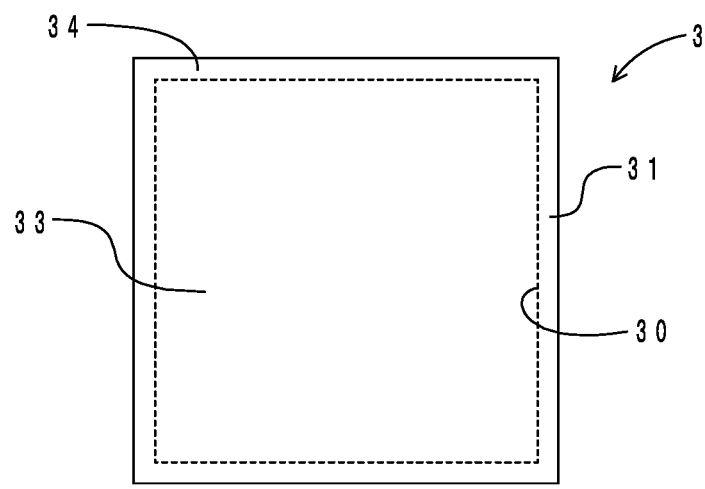
[FIG. 4]
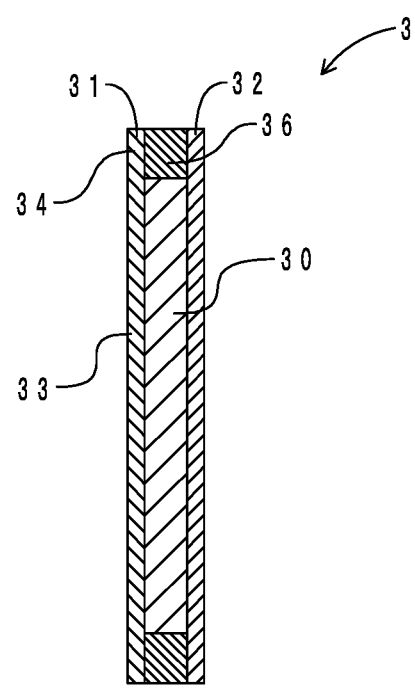

THERMAL INSULATION MATERIAL FOR BATTERY PACK AND BATTERY PACK

TECHNICAL FIELD

The present invention relates to a thermal insulation material that is placed between battery cells in a battery pack housing a plurality of battery cells.

BACKGROUND ART

Hybrid vehicles and electric vehicles are equipped with a battery pack housing a plurality of battery cells. In the battery pack, a battery module composed of a stack of the battery cells is fixed from both sides in the stacking direction by a tightening member and housed in a housing. For example, Patent Document 1 describes a composite sheet interposed between adjacent battery cells. The composite sheet has a thermal insulation layer. When the temperature of one battery cell rises, the composite sheet reduces heat transfer to battery cells adjacent to this battery cell. The thermal insulation layer is made of a non-woven fabric carrying silica xerogel thereon.

Silica xerogel and silica aerogel are porous materials in which fine silica particles are connected to form a skeleton and which have a pore structure with a pore size of about 10 nm to 50 nm. The thermal conductivity of this type of porous material is lower than the thermal conductivity of air. This type of porous material is therefore widely used as a material for a thermal insulation material. For example, Patent Document 2 describes an article that contains silica aerogel bound by water-dispersible polyurethane and that has a thermal conductivity of 0.025 W/m·K or less. When silica aerogel is used as in this article, a binder such as urethane resin is used to fix the silica aerogel and prevent shedding of the silica aerogel. However, when a conventional thermal insulation material using a urethane binder is used in a high temperature atmosphere of about 500° C., the urethane binder that is an organic component may be decomposed and deteriorated. As a result, gas may be produced or cracking may occur, and the thermal insulation material may not be able to retain its shape. Moreover, since the urethane binder is relatively soft, the thermal insulation material is crushed when compressed and it is difficult for the thermal insulation material to maintain its thermal insulation structure.

For example, Patent Documents 3 to 6 propose composite materials using an inorganic compound such as silicate as a binder. That is, Patent Document 3 describes a composite material containing silica aerogel, an organic binder or an inorganic binder, and glass fibers. In Patent Document 3, water glass (sodium silicate) is described as the inorganic binder. Patent Document 4 describes a thermal insulation material produced by solidifying an aerogel using a water-soluble binder and an inorganic binder such as sodium silicate powder. Patent Document 5 describes a flexible insulating structure in which a layer containing an aerogel and an inorganic binder such as sodium silicate is formed on a non-woven fabric (batting). Patent Document 6 describes a thermal insulation material composition containing silica aerogel, a ceramic raw material liquid capable of forming crystals by a hydrothermal reaction, a surfactant, and reinforcing fibers.

RELATED ART DOCUMENTS

Patent Documents

Patent Document 1: International Publication No. WO 2017/159527
Patent Document 2: Japanese Translation of PCT International Application Publication No. 2013-534958 (JP 2013-534958 A)
Patent Document 3: Japanese Translation of PCT International Application Publication No. 11-513349 (JP 11-513349 A)
Patent Document 4: Japanese Unexamined Patent Application Publication No. 2004-10423 (JP 2004-10423 A)
Patent Document 5: Japanese Unexamined Patent Application Publication No. 2017-155402 (JP 2017-155402 A)
Patent Document 6: International Publication No. WO 2013/141189

SUMMARY OF THE INVENTION

Problem to be Solved by the Invention

As described above, the battery cells housed in the battery pack are pressed from both sides in the stacking direction by the tightening member. Accordingly, the thermal insulation material that is interposed between the battery cells is required to be resistant to crushing and maintain its thermal insulation properties even when compressed.

When a porous material is used as a material for the thermal insulation layer forming the thermal insulation material, the thermal insulation layer is required to retain its shape even when used in a high temperature atmosphere (heat resistance) and to be resistant to crushing and breakage and maintain its thermal insulation properties even when compressed (compression resistance). However, when an inorganic compound is used as a binder, the problems caused by decomposition and deterioration of the binder are reduced, but the molded product becomes hard and brittle. Patent Documents 3 to 5 only describe the use of an inorganic binder. It is difficult to improve heat resistance and compression resistance by merely using an inorganic binder. In Patent Document 6, a ceramic raw material liquid capable of forming crystals by a hydrothermal reaction is used, and a thermal insulation material composition containing the ceramic raw material liquid is dehydrated, heated, and pressed to cause synthesis of ceramic crystals to proceed on the surfaces of silica aerogel and reinforcing fibers. The ceramic crystals thus formed serve as a binder that binds the silica aerogel. According to the manufacturing method described in Patent Document 6, the steps of preparing the thermal insulation material composition, injecting the thermal insulation material composition into a mold and dehydrating the thermal insulation material composition, and heating and pressing the resultant primary molded product. This requires a large number of man-hours and high cost. It is also difficult to form a thin film because the thermal insulation material composition is molded using a mold. The formed ceramic crystals are bulk crystals having a shape such as needle shape or fibrous shape and having a particle size of about 1 μm to 50 μm (paragraphs [0008] and [0009] of Patent Document 6). Accordingly, the obtained thermal insulation material does not have desired heat resistance and compression resistance.

The present invention has been made in view of the above circumstances, and it is an object of the present invention to provide a thermal insulation material for a battery pack having a thermal insulation layer that has not only good thermal insulation properties but also good heat resistance and compression resistance. It is another object of the present invention to provide a battery pack having the thermal insulation material for a battery pack.

Means for Solving the Problem (1) In order to solve the above problems, a thermal insulation material for a battery pack of the present invention is characterized by including: a thermal insulation layer; and a first base material and a second base material that are arranged with the thermal insulation layer interposed between the first and second base materials. The thermal insulation layer contains a porous structure in which a plurality of particles is connected to form a skeleton, reinforcing fibers, and metal oxide nanoparticles serving as a binder, the porous structure having pores inside and having hydrophobic sites at least on a surface of the porous structure out of the surface and inside of the porous structure, and a percentage mass loss of the thermal insulation layer in thermogravimetric analysis in which the thermal insulation layer is held at 500° C. for 30 minutes is 10% or less. When a compression test is performed in which the thermal insulation material is compressed under a load of 15 MPa in a thickness direction that is a stacking direction of the thermal insulation layer, the first base material, and the second base material, a rate of change of a thickness of the thermal insulation material after the compression test relative to the thickness before the compression test is less than 70%.

(2) In order to solve the above problems, a battery pack of the present invention is characterized by including: a plurality of battery cells that is lithium ion batteries; and the thermal insulation material for a battery pack having the configuration of (1) described above and placed between adjacent ones of the battery cells.

Effects of the Invention (1) According to the thermal insulation material for a battery pack of the present invention (hereinafter sometimes simply referred to as the "thermal insulation material of the present invention"), the thermal insulation layer containing the porous structure is sandwiched between the two base materials. This configuration reduces shedding (dusting) of the porous structure. When the compression test is performed in which the thermal insulation material of the present invention is compressed under a load of 15 MPa in the thickness direction, the rate of change of the thickness of the thermal insulation material after the compression test relative to the thickness before the compression test is less than 70%. That is, the thermal insulation material of the present invention is not easily crushed and can maintain desired thermal insulation properties even when compressed.

In the porous structure forming the thermal insulation layer, the particles are connected to form a skeleton. The porous structure has pores inside and has hydrophobic sites at least on the surface of the porous structure out of the surface and inside of the porous structure. The size of the pores formed between the skeletons of the porous structure is about 10 nm to 50 nm, and most of the pores are so-called mesopores with a size of 50 nm or less. Since the mesopores are smaller than the mean free path of air, heat transfer is impeded. Therefore, the thermal insulation material of the present invention having the thermal insulation layer has a good thermal insulation effect.

The thermal insulation layer contains the metal oxide nanoparticles as a binder that binds constituent components. Since no organic material is used as a binder, neither gas is produced nor cracking occurs due to decomposition and deterioration of the binder even when used in a high temperature atmosphere. Accordingly, the thermal insulation layer can retain its shape even at high temperatures, and its mass is less likely to decrease. That is, when the thermal insulation layer is held at 500° C. for 30 minutes, the percentage mass loss of the thermal insulation layer calculated from the mass before and after that is 10% or less.

The thermal insulation layer is harder when using the metal oxide nanoparticles as a binder than when using an organic material such as urethane resin as a binder. Therefore, the thermal insulation layer is not easily crushed and can maintain its thermal insulation structure even when compressed. Since the nanoparticles (particles on the order of nanometers) are used as a binder instead of the bulk crystals described in Patent Document 6, the disadvantage of using an inorganic compound as a binder, namely the disadvantage that the thermal insulation layer becomes hard and brittle, is reduced.

Moreover, the thermal insulation layer contains the reinforcing fibers. Due to the actions of both the metal oxide nanoparticles and the reinforcing fibers, the thermal insulation layer has improved shape retention at high temperatures (heat resistance) and is neither easily crushed nor broken even when compressed (that is, has improved compression resistance). The thermal insulation layer can thus maintain its thermal insulation properties even when compressed. Since the thermal insulation layer contains the reinforcing fibers, the stability and film forming properties of a coating material for forming the thermal insulation layer are improved. As a result, the strength and heat resistance of the thermal insulation layer are improved. The thermal insulation material for a battery pack of the present invention thus has good thermal insulation properties, heat resistance, and compression resistance.

(2) According to the battery pack of the present invention, the thermal insulation material of the present invention is interposed between adjacent ones of the battery cells. As described above, the thermal insulation material of the present invention is not easily crushed even when compressed. Therefore, according to the battery pack of the present invention, the thermal insulation properties of the thermal insulation material are less likely to be reduced even when the battery cells are pressed from both sides in the stacking direction. The thermal insulation layer forming the thermal insulation material of the present invention has not only good thermal insulation properties but also good shape retention at high temperatures (heat resistance). Moreover, the thermal insulation layer is neither easily crushed nor broken even when compressed (that is, the thermal insulation layer has good compression resistance). According to the battery pack of the present invention, even if the temperature of one battery cell rises, heat transfer between this battery cell and its adjacent battery cell is reduced due to the thermal insulation material of the present invention interposed between these battery cells. A chain reaction of temperature rise is therefore reduced.

BRIEF DESCRIPTION OF THE DRAWINGS

FIG. 1 is a schematic sectional view of a battery pack of a first embodiment.

FIG. 2 is a sectional view of a thermal insulation material housed in the battery pack.

FIG. 3 is a front view of the thermal insulation material.

FIG. 4 is a sectional view of a thermal insulation material of a second embodiment.

MODES FOR CARRYING OUT THE INVENTION

Hereinafter, embodiments of a thermal insulation material for a battery pack and a battery pack of the present invention will be described.

First Embodiment

First, the configuration of a thermal insulation material for a battery pack (hereinafter sometimes simply referred to as the "thermal insulation material" in the description of the embodiment) and a battery pack of a first embodiment will be described. FIG. 1 is a schematic sectional view illustrating the configuration of the battery pack of the present embodiment. FIG. 2 is a sectional view of the thermal insulation material housed in the battery pack. FIG. 3 is a front view of the thermal insulation material. In FIG. 3, a thermal insulation layer is shown as seen through by dashed line for convenience of explanation. As shown in FIGS. 1 and 2, a battery pack 1 has a housing 10, a plurality of battery cells 2, and a thermal insulation material 3.

The housing 10 is made of metal and has a box shape. The battery cells 2 are lithium ion batteries. Each battery cell 2 is in the shape of a rectangular thin plate, and the battery cells 2 are stacked in the thickness direction of the battery cells 2. The thermal insulation material 3 is placed between adjacent ones of the battery cells 2. The thermal insulation material 3 has a thermal insulation layer 30, a first base material 31, and a second base material 32.

The thermal insulation layer 30 is composed of silica aerogel, glass fibers, and silica particles. Silica particles are nanoparticles with an average particle size of 12 nm. Silica aerogel and glass fibers are bound via silica particles. The thermal insulation layer 30 is in the shape of a rectangular sheet with a thickness of 2 mm. The percentage mass loss when the thermal insulation layer 30 is held at 500° C. for 30 minutes is 10%.

The first base material 31 is placed on one side in the thickness direction of the thermal insulation layer 30. The first base material 31 is made of a glass cloth. The thickness of the first base material 31 is 0.1 mm. The size in the planar direction of the first base material 31 is slightly larger than that of the thermal insulation layer 30. The mesh of the first base material 31 is impregnated with the thermal insulation layer 30 at the contact surface between the thermal insulation layer 30 and the first base material 31. The thermal insulation layer 30 and the first base material 31 are thus bonded together. The second base material 32 is placed on the opposite side of the thermal insulation layer 30 from the first base material 31. The second base material 32 is made of the same glass cloth as the first base material 31. The thickness of the second base material 32 is 0.1 mm. The size in the planar direction of the second base material 32 is slightly larger than that of the thermal insulation layer 30. The mesh of the second base material 32 is impregnated with the thermal insulation layer 30 at the contact surface between the thermal insulation layer 30 and the second base material 32. The thermal insulation layer 30 and the second base material 32 are thus bonded together.

The material, shape, and size of the first base material 31 are the same as those of the second base material 32. The first base material 31 and the second base material 32 are fused around the thermal insulation layer 30. That is, as shown in FIG. 3, the thermal insulation material 3 has a body portion 33 and a peripheral edge portion 34. The body portion 33 is a portion where the thermal insulation layer 30, the first base material 31, and the second base material 32 overlap in the thickness direction. The peripheral edge portion 34 is a portion where the first base material 31 and the second base material 32 overlap each other around the thermal insulation layer 30. A fused portion 35 formed by fusing the first base material 31 and the second base material 32 is placed in the peripheral edge portion 34. As described above, the thermal insulation layer 30 is housed in a bag-shaped closed space formed by the first base material 31 and the second base material 32.

When a compression test is performed in which the thermal insulation material 3 is compressed under a load of 15 MPa in the thickness direction that is the stacking direction of the thermal insulation layer 30, the first base material 31, and the second base material 32, the rate of change of the thickness of the thermal insulation material 3 after the compression test relative to the thickness before the compression test is 59%.

The battery pack 1 further has a tightening member, not shown. The tightening member tightens and fixes in the stacking direction the battery module composed of a stack of the battery cells 2 with the thermal insulation material 3 between the battery cells 2.

Next, the functions and effects of the thermal insulation material and the battery pack of the present embodiment will be described. The thermal insulation material 3 has the thermal insulation layer 30 containing silica aerogel (porous structure). Accordingly, the thermal insulation material 3 has a good thermal insulation effect. The thermal insulation layer 30 is housed in the bag-shaped closed space formed by two glass cloths (first base material 31 and second base material 32). This configuration reduces shedding (dusting) of silica aerogel.

In the thermal insulation layer 30, a binder that binds constituent components such as silica aerogel is silica particles. Since an organic material is not used as a binder, neither gas is produced nor cracking occurs due to decomposition and deterioration of the binder even when used in a high temperature atmosphere. Accordingly, the thermal insulation layer 30 can retain its shape even at high temperatures, and its mass is less likely to decrease. The thermal insulation layer 30 is harder when using silica particles as a binder than when using an organic material such as urethane resin as a binder. Accordingly, the thermal insulation layer 30 is not easily crushed and can maintain its thermal insulation structure even when compressed. As silica particles are not bulk crystals but nanoparticles, the thermal insulation layer 30 does not become too hard and is less likely to become brittle even though it contains an inorganic compound.

The thermal insulation layer 30 contains glass fibers (reinforcing fibers). Due to the actions of both silica particles and glass fibers, the thermal insulation layer 30 has improved shape retention at high temperatures (heat resistance) and is neither easily crushed nor broken even when compressed (has improved compression resistance). Specifically, the rate of change of the thickness of the thermal insulation material 3 when a predetermined compression test is performed is less than 70%. The thermal insulation material 3 is therefore not easily crushed and can maintain desired thermal insulation properties even when compressed. As the thermal insulation layer 30 contains glass fibers, a coating material for forming the thermal insulation layer 30 has improved stability and film forming properties.

This also contributes to improvement in strength and heat resistance of the thermal insulation layer 30.

In the battery pack 1, the thermal insulation material 3 is interposed between adjacent ones of the battery cells 2. The thermal insulation material 3 is not easily crushed even when compressed. According to the battery pack 1, the thermal insulation properties of the thermal insulation material 3 are therefore less likely to be reduced even when the battery cells 2 are pressed from both sides in the stacking direction. The thermal insulation layer 30 has not only good thermal insulation properties and compression resistance but also good shape retention at high temperatures (heat resistance). According to the battery pack 1, even if the temperature of one battery cell 2 rises, heat transfer between this battery cell 2 and its adjacent battery cell 2 is reduced due to the thermal insulation material 3 interposed between these battery cells 2. A chain reaction of temperature rise is therefore reduced.

Second Embodiment

A thermal insulation material and a battery pack of the present embodiment are different from those of the first embodiment in that a fixing member rather than the fused portion is placed in the peripheral edge portion of the thermal insulation material. The following description focuses on the difference. FIG. 4 is a sectional view of the thermal insulation material of the present embodiment. FIG. 4 corresponds to FIG. 2, and the same portions as those in FIG. 2 are denoted by the same signs as those in FIG. 2.

As shown in FIG. 4, the thermal insulation material 3 has the thermal insulation layer 30, the first base material 31, and the second base material 32. The thermal insulation layer 30 is sandwiched between the first base material 31 and the second base material 32 that are made of a glass cloth. The thermal insulation material 3 has the body portion 33 and the peripheral edge portion 34. A fixing member 36 is placed in the peripheral edge portion 34, that is, between the first base material 31 and the second base material 32 around the thermal insulation layer 30. The fixing member 36 is an adhesive made of a thermoplastic elastomer. The thickness of the fixing member 36 is substantially the same as the thickness of the thermal insulation layer 30. The first base material 31 and the second base material 32 are bonded together by the fixing member 36.

Regarding the portions having the same configuration, the thermal insulation material and the battery pack of the present embodiment and those of the first embodiment have similar functions and effects. According to the thermal insulation material 3 of the present embodiment, the fixing member 36 is placed in the peripheral edge portion 34. As the fixing member 36 is made of a thermoplastic elastomer, the fixing member 36 has elasticity. The thickness of the fixing member 36 is substantially equal to the thickness of the thermal insulation layer 30. Accordingly, the thermal insulation material 3 can absorb the load in the stacking direction of the battery cells 2. The thermal insulation material 3 thus has high conformity to springback that occurs after the battery module is tightened.

Other Embodiments

The two embodiments of the thermal insulation material and the battery pack of the present invention are described above. However, embodiments are not limited to the above embodiments. The thermal insulation material and the battery pack of the present invention can be carried out in various improved or modified forms or other forms that can occur to those skilled in the art.

[Thermal Insulation Material for Battery Pack]

The thermal insulation material for a battery pack of the present invention includes a thermal insulation layer and a first base material and a second base material that are arranged with the thermal insulation layer therebetween.

(1) Thermal Insulation Layer

The thermal insulation layer contains a porous structure, reinforcing fibers, and metal oxide nanoparticles serving as a binder. In the porous structure, a plurality of particles is connected to form a skeleton. The porous structure has pores inside and has hydrophobic sites at least on the surface of the porous structure out of the surface and inside of the porous structure. The structure, shape, size, etc. of the porous structure are not particularly limited. For example, it is desirable that the diameter of the particles forming a skeleton (primary particles) be about 2 nm to 5 nm and the size of the pores formed between the skeletons be about 10 nm to 50 nm.

When the maximum length of the porous structure is the particle size, it is desirable that the average particle size of the porous structure be about 1 μm to 200 μm. The larger the particle size of the porous structure, the smaller the surface area and the larger the pore (void) volume, and therefore the more the thermal insulation properties are improved. For example, a porous structure with an average particle size of 10 μm or more is preferred. In view of stability of the coating material for forming the thermal insulation layer and ease of coating, a porous structure with an average particle size of 100 μm or less is preferred. When two or more types of porous structures with different particle sizes are used, the smaller diameter porous structures enter the gaps between the larger diameter porous structures. Accordingly, the filling amount of the porous structure can be increased and the thermal insulation properties are further improved.

The type of porous structure is not particularly limited. Examples of the primary particles include silica, alumina, zirconia, and titania. A porous structure in which the primary particles are silica is particularly desirable due to its high chemical stability. An example of such a porous structure is silica aerogel in which a plurality of silica particles is connected to form a skeleton. Depending on the difference in drying method used when producing an aerogel, an aerogel dried at normal pressure is sometimes called "xerogel" and an aerogel dried at supercritical pressure is sometimes called "aerogel." In this specification, however, both of them are referred to as an "aerogel."

The porous structure has hydrophobic sites at least on the surface of the porous structure out of the surface and inside of the porous structure. As the porous structure has hydrophobic sites on its surface, penetration of water etc. is reduced. Accordingly, the pore structure is maintained, and the thermal insulation properties are less likely to be reduced. For example, silica aerogel having hydrophobic sites at least on its surface can be produced by performing a hydrophobization treatment, such as adding hydrophobic groups, during the production process.

The content of the porous structure can be determined as appropriate in view of the thermal conductivity, hardness, compression resistance, etc. of the thermal insulation layer. For example, in order to reduce thermal conductivity and achieve desired compression resistance, the content of the porous structure is 25 parts by mass or more per 100 parts by mass of the components other than the porous structure and the reinforcing fibers. It is more preferable that the content of the porous structure be 50 parts by mass or more.

If the content of the porous structure is too high, the film forming properties are reduced and dusting tends to occur. It is therefore desirable that the content of the porous structure be 280 parts by mass or less per 100 parts by mass of the components other than the porous structure and the reinforcing fibers.

The reinforcing fibers are physically intertwined around the porous structure. The reinforcing fibers thus reduce shedding of the porous structure and improve the film forming properties and the heat resistance. The type of reinforcing fibers is not particularly limited, but an inorganic fiber material is desirable in terms of reducing decomposition and deterioration of organic components when used at high temperatures. For example, glass fibers or ceramic fibers such as alumina fibers are preferred.

The size of the reinforcing fibers can be determined as appropriate in view of the thermal insulation properties and heat resistance of the thermal insulation layer, the film forming properties when forming the thermal insulation layer, etc. For example, if the reinforcing fibers are too thin, the reinforcing fibers tend to aggregate. This may cause an increase in viscosity of the coating material for forming the thermal insulation layer and thus may reduce the film forming properties. A preferred diameter of the reinforcing fibers is 6.5 µm or more. On the other hand, if the reinforcing fibers are too thick, the reinforcing effect is reduced. As a result, the film forming properties and the heat resistance may be reduced. Moreover, since the heat transfer path tends to be formed, the thermal conductivity may be increased and the thermal insulation properties may be reduced. A preferred diameter of the reinforcing fibers is 18 µm or less. If the reinforcing fibers are too short, the reinforcing effect is reduced. As a result, the film forming properties and the heat resistance may be reduced. A preferred length is 3 mm or more. On the other hand, if the reinforcing fibers are too long, the reinforcing fibers tend to aggregate. This may cause an increase in viscosity of the coating material for forming the thermal insulation layer and thus may reduce the film forming properties. Moreover, since the heat transfer path tends to be formed, the thermal conductivity may be increased and the thermal insulation properties may be reduced. A preferred length of the reinforcing fibers is 25 mm or less.

The content of the reinforcing fibers can be determined as appropriate in view of the film forming properties, heat resistance, etc. of the thermal insulation layer. For example, in order to provide sufficient film forming properties and achieve desired heat resistance, the content of the reinforcing fibers is 5 parts by mass or more per 100 parts by mass of the components other than the porous structure and the reinforcing fibers. On the other hand, if the content of the reinforcing fibers is too high, the reinforcing fibers tend to aggregate. This may cause an increase in viscosity of the coating material for forming the thermal insulation layer and thus may reduce the film forming properties. Moreover, since the heat transfer path tends to be formed, the thermal conductivity may be increased and the thermal insulation properties may be reduced. The content of the reinforcing fibers is therefore desirably 200 parts by mass or less, more desirably 130 parts by mass or less, per 100 parts by mass of the components other than the porous structure and the reinforcing fibers.

The metal oxide nanoparticles are a binder that binds the constituent components of the thermal insulation layer such as the porous structure and the reinforcing fibers. The type of metal oxide is not particularly limited. Examples of the metal oxide include silica, titania, zinc oxide, and zirconia. Among these, silica is preferable as it is easily compatible with the porous structure and the reinforcing fibers and is inexpensive and easily available. That is, it is desirable that the metal oxide nanoparticles be silica particles.

In thermogravimetric analysis in which the thermal insulation layer is held at 500° C. for 30 minutes, the percentage mass loss of the thermal insulation layer is 10% or less. In thermogravimetric analysis (TGA), a sample of the thermal insulation layer is held in an air atmosphere at 500° C. for 30 minutes, and the mass is measured before and after the heating. The percentage mass loss is calculated by the following formula (I).

$$\text{Percentage mass loss (\%)}=(W_0-W_1)/W_0\times 100 \quad \text{(I)}$$

[$W_0$: Sample Mass Before Heating, $W_1$: Sample Mass after Heating]

The thermal insulation layer may contain other components in addition to the porous structure, the reinforcing fibers, and the metal oxide nanoparticles. Examples of such components include a thickener, a dispersant, a surfactant, etc. that are added to improve dispersibility of the porous structure when preparing the coating material for forming the thermal insulation layer.

(2) First Base Material and Second Base Material

The first base material is placed on one side of the thermal insulation layer, and the second base material is placed on the opposite side of the thermal insulation layer from the first base material. The first base material and the second base material may be the same or different in terms of material, shape, size, etc. A woven fabric, non-woven fabric, sheet material, etc. may be used as the first base material and the second base material. Among these, materials with a relatively low thermal conductivity are preferred. Materials with good shape retention even at high temperatures and flame retardancy are desirable. Examples of such materials include woven fabrics and non-woven fabrics made of inorganic fibers such as glass fibers and metal fibers. A glass cloth is particularly preferred. The first base material and the second base material may be composed of one layer or may be a laminate of two or more layers.

The thermal insulation material of the present invention may have a body portion in which the first base material and the second base material are stacked with the thermal insulation layer interposed between the first and second base materials, and a peripheral edge portion in which the first base material and the second base material overlap each other, the peripheral edge portion being located around the thermal insulation layer. In this case, by fixing the first base material and the second base material in the peripheral edge portion, the thermal insulation layer can be housed in the bag-shaped space formed by the two base materials. The peripheral edge portion may be either partially or entirely fixed. When the entire peripheral edge portion is fixed, the thermal insulation layer can be housed in the closed space. This is effective in reducing dusting of the porous structure. The fixing method is not particularly limited. However, the first base material and the second base material may be fused using a laser etc. Alternatively, a fixing member such as adhesive, clip member, caulking member, or plate spring member may be used. A member made of an elastomer such as thermoplastic elastomer and rubber, a resin, or a metal may be fixed with an adhesive and may be used as a fixing member. Examples of the adhesive include organic adhesives using an elastomer or a resin. For example, when the adhesive has elasticity, the adhesive can absorb the load that is applied when the thermal insulation material is compressed in the stacking direction (thickness direction). The adhesive can also conform to springback that occurs after the battery module is tightened. In this case, using the adhesive with a thickness equal to or greater than the thickness of the thermal insulation layer is effective in reducing breakage of the thermal insulation layer. In order to increase flame retardancy, it is desirable to use a flame-retardant organic adhesive such as fluororubber or an inorganic adhesive.

(3) Compression Resistance of Thermal Insulation Material for Battery Pack

When a compression test is performed in which the thermal insulation material for a battery pack of the present invention is compressed under a load of 15 MPa in the thickness direction that is the stacking direction of the thermal insulation layer, the first base material, and the second base material, the rate of change of the thickness of the thermal insulation material for a battery pack after the compression test relative to the thickness before the compression test is less than 70%.

The compression test is performed as follows. First, the thermal insulation material whose thickness has been measured in advance is compressed at a rate of 3 mm/min until the compression pressure reaches 15 MPa. When the compression pressure reaches 15 MPa, the thermal insulation material is held at this compression pressure for 1 minute. Next, the compression pressure is returned to 0 MPa (no load) at a similar rate. Then, the thickness of the thermal insulation material is measured, and the rate of change in thickness of the thermal insulation material is calculated by the following formula (II). The rate of change in thickness is preferably 65% or less, more preferably 60% or less.

$$\text{Rate of change in thickness (\%)} = (T_0 - T_1)/T_0 \times 100 \quad \text{(II)}$$

[$T_0$: Thickness of Thermal Insulation Layer Before Compression, $T_1$: Thickness of Thermal Insulation Layer after Compression]

(4) Method for Manufacturing Thermal Insulation Material for Battery Pack

The thermal insulation material of the present invention can be manufactured by solidifying a composition containing the porous structure, the reinforcing fibers, and the metal oxide nanoparticles and sandwiching the composition between the first base material and the second base material. An example of a method for manufacturing the thermal insulation material of the present invention is a method including: a coating material preparation step of preparing a coating material for a thermal insulation layer containing a porous structure, reinforcing fibers, and a dispersion having metal oxide nanoparticles dispersed therein; a coating step of coating the first base material with the coating material for a thermal insulation layer; and a curing step of placing the second base material on the formed coating film to form a laminate and then curing the coating film.

In this manufacturing method, it is neither necessary to cause a hydrothermal reaction to proceed during production of the thermal insulation layer to synthesize bulk crystals, nor to use a mold as in Patent Document 6. Therefore, the thermal insulation layer can be relatively easily manufactured. Moreover, since the method in which coating with the coating material for a thermal insulation layer is performed is used, a thin thermal insulation layer can be easily formed. The coating material for a thermal insulation layer contains reinforcing fibers and therefore has good stability and film forming properties. Accordingly, a thermal insulation layer having good strength and heat resistance can be manufactured.

In the coating material preparation step, the coating material for a thermal insulation layer may be prepared by adding a porous structure, reinforcing fibers, and any necessary components to a dispersion having metal oxide nanoparticles dispersed therein and stirring the mixture. The liquid (dispersion medium) forming the dispersion is not particularly limited. However, in order to reduce infiltration of the liquid into pores of the porous structure, it is desirable to use a hydrophilic liquid such as water (including pure water, tap water, etc.) rather than a hydrophobic liquid. For example, when the metal oxide nanoparticles are silica particles, an aqueous solution of sodium silicate, colloidal silica containing water as a dispersion medium, etc. can be used. When the metal oxide nanoparticles are titania particles, an aqueous dispersion of titania etc. can be used. The stirring may be blade stirring. However, the stirring may be performed by actively applying a shearing force or applying ultrasonic waves. A rotation and revolution stirrer or a media stirrer may be used.

A coater such as bar coater, die coater, Comma Coater (registered trademark), or roll coater, a spray, etc. may be used to coat the first base material with the coating material for a thermal insulation layer in the coating step. Alternatively, the first base material may be immersed in the coating material for a thermal insulation layer and then dried. Regardless of whether the first base material is coated with the coating material for a thermal insulation layer or immersed in the coating material for a thermal insulation layer, the first base material may be impregnated with a part of the coating material for a thermal insulation layer when the first base material is a porous material such as woven fabric. In order to improve adhesion between the first base material and the thermal insulation layer, the surface of the first base material may be subjected to a pretreatment such as coupling treatment before the first base material is coated with the coating material for a thermal insulation layer.

In the curing step, the coating film is cured after the laminate of the first base material, the coating film of coating material for thermal insulation layer, and the second base material is formed. For example, the laminate may be dried to cure the coating film. The drying may be performed as appropriate according to the dispersion medium in the coating material for a thermal insulation layer. For example, when the dispersion medium is water, the coating film may be held at a temperature of about room temperature to about 150° C. for a predetermined time.

[Battery Pack]

The battery pack can be formed by stacking a plurality of battery cells and the thermal insulation material of the present invention. Although the type of battery cells is not particularly limited, the battery cells may be, for example, lithium ion batteries. As an example of a battery pack using the thermal insulation material of the present invention, the battery pack of the present invention includes a plurality of battery cells that is lithium ion batteries and the thermal insulation material of the present invention placed between adjacent ones of the battery cells. Other configurations in the battery pack of the present invention are not limited. The battery pack of the present invention may have a tightening member that tightens a battery module composed of a stack of a plurality of battery cells and the thermal insulation material of the present invention from both sides in the stacking direction, a housing that houses the battery module, etc.

EXAMPLES

Next, the present invention will be described in more detail using examples.

(1) Manufacturing of Thermal Insulation Material for Battery Pack

First, various coating materials for a thermal insulation layer were prepared according to the amounts (unit: parts by mass) shown in Tables 1 and 2 below. Next, the surface of a first glass cloth is coated with each of the prepared coating materials for a thermal insulation layer with a thickness of 2 mm. Then, a second glass cloth was placed on the coating film to form a laminate. The laminate was placed in a hot air oven and held at 80° C. for 1 hour, and then heated to 100° C. and dried until the mass no longer decreased. A sheet-like thermal insulation material sample composed of the first glass cloth, the thermal insulation layer, and the second glass cloth was thus manufactured. The first glass cloth is included in the concept of the first base material in the present invention, and the second glass cloth is included in the concept of the second base material in the present invention. Hereinafter, a method for preparing a coating material for a thermal insulation layer in each sample will be described in detail.

Examples 1 to 15, 17

Polyethylene oxide ("PEO (registered trademark)-29" made by Sumitomo Seika Chemicals Company, Limited.) as a thickener was added to colloidal silica (aqueous dispersion of silica particles; "LUDOX (registered trademark) LS" made by Sigma-Aldrich) and stirred. Subsequently, a pulverized product of silica aerogel was added and stirred, and then glass fibers were further added and stirred to prepare a coating material for a thermal insulation layer. Colloidal silica diluted with water was used when necessary to adjust the viscosity of the coating material for a thermal insulation layer. The pulverized product of silica aerogel is silica aerogel having hydrophobic sites on its surface and inside ("P200" made by Cabot Corporation) pulverized using a home mixer, and the average particle size is 100 μm. Regarding the glass fibers, five types (A to E) of glass fibers having different aspect ratios (length/diameter) were selected from "Chopped Strands" made by Nippon Electric Glass Co., Ltd. and used.

Example 16

A coating material for a thermal insulation layer was prepared in a manner similar to that of Example 2 except that non-pulverized silica aerogel ("P200" made by Cabot Corporation) was used instead of the pulverized product of silica aerogel. The coating materials for a thermal insulation layer of Examples 1 to 17 are included in the concept of the coating material for a thermal insulation layer of the present invention.

Comparative Example 1

A coating material for a thermal insulation layer was prepared by using a conventional organic binder as a binder instead of an inorganic binder and without adding glass fibers. That is, a urethane resin emulsion ("PERMARIN (registered trademark) UA-368" made by Sanyo Chemical Industries, Ltd., solid content: 50 mass %) as a binder and polyethylene oxide (same as above) as a thickener were added to water and stirred. Thereafter, a pulverized product of silica aerogel was added and stirred to prepare a coating material for a thermal insulation layer of Comparative Example 1.

Comparative Example 2

A coating material for a thermal insulation layer of Comparative Example 2 was prepared in a manner similar to that of Examples 1 to 5 except that silica aerogel was not added.

Comparative Example 3

A coating material for a thermal insulation layer of Comparative Example 3 was prepared in a manner similar to that of Examples 2, 6 to 15, and 17 except that glass fibers were not added.

Comparative Example 4

A coating material for a thermal insulation layer of Comparative Example 4 was prepared in a manner similar to that of Example 16 (that uses non-pulverized silica aerogel) except that glass fibers were not added.

TABLE 1

| Components of Thermal Insulation Layer [Parts by Mass] | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Inorganic Binder (Metal Oxide Nanoparticles) | Silica Particles | 81.3 | 81.3 | 81.3 | 81.3 | 81.3 | — | 81.3 | 81.3 | 81.3 |
| Organic Binder | Urethane Resin | — | — | — | — | — | 81.3 | — | — | — |
| Thickener | Polyethylene Oxide | 18.7 | 18.7 | 18.7 | 18.7 | 18.7 | 18.7 | 18.7 | 18.7 | 18.7 |
| Porous Structure | Silica Aerogel (Pulverized Product) | 280 | 230 | 150 | 50 | 25 | 230 | — | 230 | — |
| | Silica Aerogel (Untreated Product) | — | — | — | — | — | — | — | — | 230 |
| Reinforcing Fibers | Glass Fibers A | 26 | 26 | 26 | 26 | 26 | — | 26 | — | — |
| | Glass Fibers B | — | — | — | — | — | — | — | — | — |
| | Glass Fibers C | — | — | — | — | — | — | — | — | — |
| | Grass Fibers D | — | — | — | — | — | — | — | — | — |
| | Glass Fibers E | — | — | — | — | — | — | — | — | — |
| Glass Fiber Length [mm] | | 3 | 3 | 3 | 3 | 3 | — | 3 | — | — |
| Glass Fiber Diameter [μm] | | 6.5 | 6.5 | 6.5 | 6.5 | 6.5 | — | 6.5 | — | — |
| Glass Fiber Aspect Ratio (Length/Diameter) | | 462 | 462 | 462 | 462 | 462 | — | 462 | — | — |
| Percentage Mass Loss of Thermal Insulation Layer [%] | | 10 | 10 | 10 | 10 | 10 | 16 | 10 | 10 | 10 |

TABLE 1-continued

| Components of Thermal Insulation Layer [Parts by Mass] | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Film Forming Properties | Evaluation | ○ | ○ | ○ | ○ | ○ | ○ | ○ | X | X |
| | Cracking | No | No | No | No | No | No | No | Yes | Yes |
| Thermal Insulation Properties | Evaluation | ○ | ○ | ○ | ○ | ○ | ○ | X | ○ | ○ |
| | Thermal Conductivity [W/m·K] | 0.025 | 0.026 | 0.026 | 0.029 | 0.033 | 0.025 | 0.049 | 0.025 | 0.025 |
| Compression Resistance (Thermal Conductivity) | Evaluation | ○ | ○ | ○ | ○ | ○ | X | X | ○ | ○ |
| | Thermal Conductivity After Compression Test [W/m·K] | 0.031 | 0.033 | 0.033 | 0.039 | 0.042 | — | 0.051 | 0.032 | 0.035 |
| Compression Resistance (Change in Thickness) | Evaluation | ○ | ○ | ○ | ○ | ○ | X | ○ | X | ○ |
| | Rate of Change in Thickness Before and After Compression Test [%] | 59 | 57 | 58 | 52 | 38 | 90 | 12 | 70 | 60 |
| Heat Resistance (High Temperature Shape Retention of Thermal Insulation Layer) | Evaluation | ○ | ○ | ○ | ○ | ○ | X | ○ | X | X |
| | Breakage | No | No | No | No | No | Yes | No | Yes | Yes |

TABLE 2

| Components of Thermal Insulation Layer [Parts by Mass] | | Example 6 | Example 7 | Example 8 | Example 9 | Example 10 | Example 11 | Example 12 |
|---|---|---|---|---|---|---|---|---|
| Inorganic Binder (Metal Oxide Nanoparticles) | Silica Particles | 81.3 | 81.3 | 81.3 | 81.3 | 81.3 | 81.3 | 81.3 |
| Organic Binder | Urethane Resin | — | — | — | — | — | — | — |
| Thickener | Polyethylene Oxide | 18.7 | 18.7 | 18.7 | 18.7 | 18.7 | 18.7 | 18.7 |
| Porous Structure | Silica Aerogel (Pulverized Product) | 230 | 230 | 230 | 230 | 230 | 230 | 230 |
| | Silica Aerogel (Untreated Product) | — | — | — | — | — | — | — |
| Reinforcing Fibers | Glass Fibers A | 5 | 13 | 39 | 78 | 104 | 130 | — |
| | Glass Fibers B | — | — | — | — | — | — | 26 |
| | Glass Fibers C | — | — | — | — | — | — | — |
| | Grass Fibers D | — | — | — | — | — | — | — |
| | Glass Fibers E | — | — | — | — | — | — | — |
| Glass Fiber Length [mm] | | 3 | 3 | 3 | 3 | 3 | 3 | 3 |
| Glass Fiber Diameter [μm] | | 6.5 | 6.5 | 6.5 | 6.5 | 6.5 | 6.5 | 10 |
| Glass Fiber Aspect Ratio (Length/Diameter) | | 462 | 462 | 462 | 462 | 462 | 462 | 300 |
| Percentage Mass Loss of Thermal Insulation Layer [%] | | 10 | 10 | 10 | 10 | 10 | 10 | 10 |
| Film Forming Properties | Evaluation | ○ | ○ | ○ | ○ | ○ | ○ | ○ |
| | Cracking | No | No | No | No | No | No | No |
| Thermal Insulation Properties | Evaluation | ○ | ○ | ○ | ○ | ○ | ○ | ○ |
| | Thermal Conductivity [W/m·K] | 0.026 | 0.026 | 0.025 | 0.025 | 0.026 | 0.026 | 0.025 |
| Compression Resistance (Thermal Conductivity) | Evaluation | ○ | ○ | ○ | ○ | ○ | ○ | ○ |
| | Thermal Conductivity After Compression Test [W/m·K] | 0.031 | 0.030 | 0.030 | 0.031 | 0.031 | 0.030 | 0.031 |
| Compression Resistance (Change in Thickness) | Evaluation | ○ | ○ | ○ | ○ | ○ | ○ | ○ |
| | Rate of Change in Thickness Before and After Compression Test [%] | 65 | 62 | 61 | 59 | 53 | 57 | 52 |
| Heat Resistance (High Temperature Shape Retention of Thermal Insulation Layer) | Evaluation | ○ | ○ | ○ | ○ | ○ | ○ | ○ |
| | Breakage | No | No | No | No | No | No | No |

| Components of Thermal Insulation Layer [Parts by Mass] | | Example 13 | Example 14 | Example 15 | Example 16 | Example 17 |
|---|---|---|---|---|---|---|
| Inorganic Binder (Metal Oxide Nanoparticles) | Silica Particles | 81.3 | 81.3 | 81.3 | 81.3 | 81.3 |

TABLE 2-continued

| | | | | | | |
|---|---|---|---|---|---|---|
| Organic Binder | Urethane Resin | — | — | — | — | — |
| Thickener | Polyethylene Oxide | 18.7 | 18.7 | 18.7 | 18.7 | 18.7 |
| Porous Structure | Silica Aerogel (Pulverized Product) | 230 | 230 | 230 | — | 230 |
| | Silica Aerogel (Untreated Product) | — | — | — | 230 | — |
| Reinforcing Fibers | Glass Fibers A | — | — | — | 26 | 200 |
| | Glass Fibers B | — | — | — | — | — |
| | Glass Fibers C | 26 | — | — | — | — |
| | Grass Fibers D | — | 26 | — | — | — |
| | Glass Fibers E | — | — | 26 | — | — |
| Glass Fiber Length [mm] | | 13 | 25 | 13 | 3 | 3 |
| Glass Fiber Diameter [μm] | | 13 | 13 | 18 | 6.5 | 6.5 |
| Glass Fiber Aspect Ratio (Length/Diameter) | | 1000 | 1923 | 722 | 462 | 462 |
| Percentage Mass Loss of Thermal Insulation Layer [%] | | 10 | 10 | 10 | 10 | 10 |
| Film Forming Properties | Evaluation | ○ | ○ | ○ | ○ | ○*1 |
| | Cracking | No | No | No | No | No |
| Thermal Insulation Properties | Evaluation | ○ | ○ | ○ | ○ | ○ |
| | Thermal Conductivity [W/m · K] | 0.026 | 0.024 | 0.025 | 0.025 | 0.027 |
| Compression Resistance (Thermal Conductivity) | Evaluation | ○ | ○ | ○ | ○ | ○ |
| | Thermal Conductivity After Compression Test [W/m · K] | 0.032 | 0.031 | 0.032 | 0.032 | 0.032 |
| Compression Resistance (Change in Thickness) | Evaluation | ○ | ○ | ○ | ○ | ○ |
| | Rate of Change in Thickness Before and After Compression Test [%] | 62 | 59 | 61 | 60 | 60 |
| Heat Resistance (High Temperature Shape Retention of Thermal Insulation Layer) | Evaluation | ○ | ○ | ○ | ○ | ○ |
| | Breakage | No | No | No | No | No |

*1Workability decreased (2) Percentage Mass Loss of Thermal Insulation Layer

Each of the thermal insulation material samples of the examples includes two glass cloths in addition to the thermal insulation layer. Accordingly, only the thermal insulation layer was cut from each thermal insulation material sample by a mass of 3 mg to 5 mg, and the percentage mass loss of the thermal insulation layer was calculated as follows using the cut thermal insulation layer as a sample for measurement of the percentage mass loss. First, each sample for measurement of the percentage mass loss was placed in a thermogravimetric analyzer ("Q500" made by TA Instruments) and heated from room temperature to 500° C. at a rate of 80° C./min in an air atmosphere. When the temperature reached 500° C., the sample for measurement of the percentage mass loss was held at 500° C. for 30 minutes. The sample was then removed and the mass of the sample was measured. The percentage mass loss of the thermal insulation layer was then calculated by the above formula (I), where $W_0$ represents the initial mass of the sample for measurement of the percentage mass loss and $W_1$ represents the mass after the sample for measurement of the percentage mass loss was held at 500° C. for 30 minutes. The percentage mass losses of the thermal insulation layers thus obtained are shown in Tables 1 and 2 above.

(3) Method for Evaluating Thermal Insulation Material

The film forming properties, thermal insulation properties, compression resistance, and heat resistance of the manufactured thermal insulation material samples were evaluated by the following method.

[Film Forming Properties]

The appearance of the thermal insulation material samples was visually observed to check for cracking. In Tables 1 and 2 above, as the evaluation results, "o" indicates a sample with no cracking observed, and "x" indicates a sample with cranking observed.

[Thermal Insulation Properties]

The thermal conductivity of each thermal insulation material sample was measured using a thermal conductivity tester "Quick Lambda" made by Eiko Instruments. This thermal conductivity tester calculates a relative thermal conductivity using a test curve calibrated using substances with a known thermal conductivity as standard samples for testing. Accordingly, three types of thermal insulation material samples containing different amounts of silica aerogel were first manufactured as standard samples by the same method as the method for manufacturing the sample of Comparative Example 1. The amounts of silica aerogel contained in the samples were 153 parts by mass, 230 parts by mass, and 307 parts by mass. Next, the thermal conductivity of each sample (standard sample) was measured with a heat flux meter "HC-074" made by Eiko Instruments in accordance with the heat flow meter method of JIS A 1412-2 (1999). The thermal conductivity tester was calibrated using the measured thermal conductivity values. In Tables 1 and 2 above, as the evaluation results, "o" indicates a sample with a thermal conductivity of 0.045 W/m·K or less and "x" indicates a sample with a thermal conductivity of greater than 0.045 W/m·K.

[Compression Resistance]

A disk-shaped sample with a diameter of 60 mm was cut from each thermal insulation material sample and was used as a sample for compression test. Each sample for compression test was placed in a compression tester and was compressed at a rate of 3 mm/min until the compression pressure reached 15 MPa. When the compression pressure reached 15 MPa, the sample for compression test was held at this compression pressure for 1 minute. The compression pressure was then returned to 0 MPa (no load) at a similar rate.

The thermal conductivity of each sample for compression test after compression was measured using the thermal conductivity tester mentioned above. In Tables 1 and 2 above, as the evaluation results, "○" indicates a sample with a thermal conductivity of 0.045 W/m·K or less and "x" indicates a sample with a thermal conductivity of greater than 0.045 W/m·K.

The thickness of each sample for compression test was measured before and after compression, and the rate of change in thickness was calculated by the above formula (II). In Tables 1 and 2 above, as the evaluation results, "○" indicates a sample whose rate of change in thickness was less than 70%, and "x" indicates a sample whose rate of change in thickness was 70% or more.

[Heat Resistance]

Each of the coating materials for a thermal insulation layer prepared when manufacturing the thermal insulation material samples was poured into a rectangular parallelepiped mold with a volume of 1 cm³. The mold was placed in a hot air oven and held at 80° C. for 1 hour, and then heated to 100° C. and the coating material was dried until the mass no longer decreased. The dried coating material was removed from the mold. The molded product thus obtained was further held at 600° C. for 10 minutes and was checked for breakage. In Tables 1 and 2 above, as the evaluation results, "○" indicates a molded product with no breakage observed, and "x" indicates a molded product with breakage observed.

(4) Evaluation Results for Thermal Insulation Materials

The evaluation results for the thermal insulation materials are shown in Tables 1 and 2 above. As shown in Table 1, for all of the samples of Examples 1 to 5 using an inorganic binder (silica particles) and containing reinforcing fibers (glass fibers), the percentage mass loss of the thermal insulation layer was 10% or less, and the film forming properties, thermal insulation properties, compression resistance, and heat resistance were satisfactory. That is, for each of the samples of Examples 1 to 5, a thin film-like thermal insulation layer with no cracking was formed, the thermal conductivity was relatively low, and the sample was not easily crushed and was able to maintain thermal insulation properties even when compressed. Moreover, the sample was able to retain its shape without breaking even when it was held at high temperatures. As the amount of silica aerogel increased, the thermal conductivity tended to decrease (thermal insulation properties tended to improve), but a change in thickness due to compression tended to increase.

On the other hand, for the sample of Comparative Example 1 using an organic binder, the percentage mass loss of the thermal insulation layer was larger than 10%, and the film forming properties and the thermal insulation properties were satisfactory. However, the sample was crushed when compressed, and the thermal conductivity was not able to be measured. The sample thus had poor compression resistance. Moreover, the sample broke when it was held at high temperatures. The sample thus had poor heat resistance. The sample of Comparative Example 2 containing no silica aerogel did not have desired thermal insulation properties. The samples of Comparative Examples 3 and 4 containing no reinforcing fibers had degraded film forming properties and were not able to retain their shape at high temperatures.

As shown in Table 2, for all of the samples of Examples 6 to 17, the percentage mass loss of the thermal insulation layer was 10% or less, and the film forming properties, thermal insulation properties, compression resistance, and heat resistance were satisfactory. Comparison among the samples of Examples 6 to 11 containing different amounts of the reinforcing fibers shows that as the amount of reinforcing fibers increased, a change in thickness due to compression tended to decrease, and the compression resistance improved. For the sample of Example 17 containing the largest amount of reinforcing fibers, the viscosity of the coating material for a thermal insulation layer increased, and workability decreased. The samples of Examples 12 to 15 contained different types (aspect ratios) of reinforcing fibers, but all of the samples of Examples 12 to 15 had satisfactory film forming properties, thermal insulation properties, compression resistance, and heat resistance. The sample of Example 16 is different from the sample of Example 2 in whether silica aerogel had been pulverized. When a pulverized product was used as in Example 2, the viscosity of the coating material for a thermal insulation layer was reduced. As a result, the mixing and dispersing time during preparation of the coating material can be reduced, and workability is expected to be improved. Moreover, dusting of silica aerogel was reduced and shape retention was improved.

DESCRIPTION OF THE REFERENCE SIGNS

1: Battery Pack, 10: Housing, 2: Battery Cell, 3: Thermal Insulation Material, 30: Thermal Insulation Layer, 31: First Base Material, 32: Second Base Material, 33: Body Portion, 34: Peripheral Edge Portion, 35: Fused Portion, and 36: Fixing Member.

The invention claimed is:

1. A thermal insulation material for a battery pack, the thermal insulation material comprising:
   a thermal insulation layer; and
   a first base material and a second base material that are arranged with the thermal insulation layer interposed between the first and second base materials, wherein
   the thermal insulation layer contains a porous structure in which a plurality of particles is connected to form a skeleton, reinforcing fibers, metal oxide nanoparticles serving as a binder, and polyethylene oxide as a thickener, the porous structure having pores inside and having hydrophobic sites at least on a surface of the porous structure out of the surface and inside of the porous structure, and a percentage mass loss of the thermal insulation layer in thermogravimetric analysis in which the thermal insulation layer is held at 500° C. for 30 minutes is 10% or less,
   in a state in which a compression test is performed in which the thermal insulation material is compressed under a load of 15 MPa in a thickness direction that is a stacking direction of the thermal insulation layer, the first base material, and the second base material, a rate of change of a thickness of the thermal insulation material after the compression test relative to the thickness before the compression test is less than 70%,
   an average particle size of the porous structure is 1 μm or more and 200 μm or less, and
   the reinforcing fibers are intertwined around the porous structure.

2. The thermal insulation material for a battery pack according to claim 1, wherein the nanoparticles are silica particles.

3. The thermal insulation material for a battery pack according to claim 1, wherein the porous structure is silica aerogel in which a plurality of silica particles is connected to form a skeleton.

4. The thermal insulation material for a battery pack according to claim 1, wherein a content of the porous structure in the thermal insulation layer is 150 parts by mass or more and 280 parts by mass or less per 100 parts by mass of components other than the porous structure and the reinforcing fibers.

5. The thermal insulation material for a battery pack according to claim 1, wherein the reinforcing fibers are one or more types of fibers selected from glass fibers and alumina fibers.

6. The thermal insulation material for a battery pack according to claim 1, wherein a content of the reinforcing fibers in the thermal insulation layer is 5 parts by mass or more and 200 parts by mass or less per 100 parts by mass of the components other than the porous structure and the reinforcing fibers.

7. The thermal insulation material for a battery pack according to claim 1, wherein the reinforcing fibers have a diameter of 6.5 μm or more and 18 μm or less and a length of 3 mm or more and 25 mm or less.

8. The thermal insulation material for a battery pack according to claim 1, wherein either or both of the first base material and the second base material is a glass cloth.

9. The thermal insulation material for a battery pack according to claim 1, wherein the thermal insulation material has a body portion in which the first base material and the second base material are stacked with the thermal insulation layer interposed between the first and second base materials, and a peripheral edge portion in which the first base material and the second base material overlap each other, the peripheral edge portion being located around the thermal insulation layer.

10. The thermal insulation material for a battery pack according to claim 9, wherein the first base material and the second base material are fused in the peripheral edge portion.

11. The thermal insulation material for a battery pack according to claim 9, wherein a fixing member that fixes the first base material and the second base material is placed in the peripheral edge portion.

12. The thermal insulation material for a battery pack according to claim 11, wherein the fixing member has elasticity.

13. A battery pack, comprising:
a plurality of battery cells that is lithium ion batteries; and
the thermal insulation material for a battery pack according to claim 1 that is placed between adjacent ones of the battery cells.

14. The thermal insulation material for a battery pack according to claim 9, wherein
both of the first base material and the second base material are made of non-woven fabric, and
by fixing the first base material and the second base material in the peripheral edge portion, the thermal insulation layer can be housed in the bag-shaped space formed by the first base material and the second base material.

* * * * *